Patented July 22, 1941

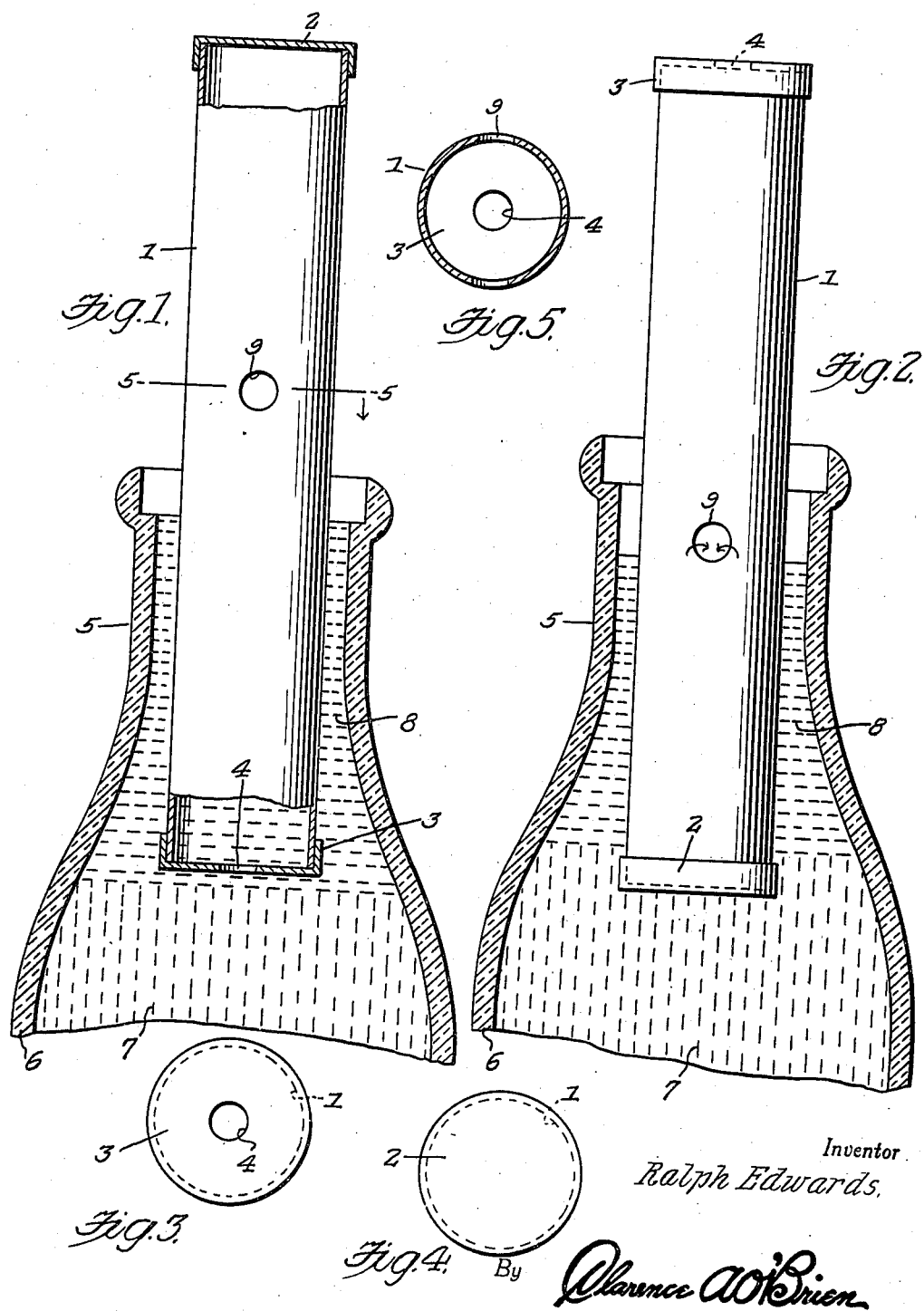

2,250,363

UNITED STATES PATENT OFFICE 2,250,363

CREAM SEPARATOR

Ralph Edwards, Osceola, Ind.

Application March 15, 1940, Serial No. 324,212

2 Claims. (Cl. 210—51.5)

The present invention relates to new and useful improvements in cream separators and has for its primary object to provide, in a manner as hereinafter set forth, a device of this character comprising a novel construction and arrangement whereby substantially all of the cream may be expeditiously removed from a bottle without disturbing the milk therein.

Other objects of the invention are to provide a cream separator of the aforementioned character which will be comparatively simple in construction, strong, durable, highly efficient and reliable in use, compact, sanitary and which may be manufactured at low cost.

All of the foregoing and still further objects and advantages of the invention will become apparent from a study of the following specification, taken in connection with the accompanying drawing wherein like characters of reference designate corresponding parts throughout the several views and wherein:

Figure 1 is an elevational view of a cream separator constructed in accordance with the present invention, illustrating the first step taken when using the device, the end portions of said device being broken away in section.

Figure 2 is an elevational view of the device, illustrating the second step.

Figures 3 and 4 are end views of the device.

Figure 5 is a view in horizontal section, taken substantially on the line 5—5 of Figure 1.

Referring now to the drawing in detail, it will be seen that the embodiment of the invention which has been illustrated comprises a tube 1 which may be of any suitable material. Mounted on the ends of the tube 1 are caps 2 and 3. The cap 3 has formed therein a centrally located opening 4 the purpose of which will be presently set forth.

The tube 1 is of a diameter to be inserted downwardly in the neck 5 of a conventional milk bottle 6. Then, the tube 1 is of any desired length, preferably about 7 inches. In Figs. 1 and 2 of the drawing, the reference numeral 7 indicates the milk in the bottle 6 and the reference numeral 8 designates the cream on the milk.

Formed in an intermediate portion of the tube 1 are diametrically opposite openings 9. It will be observed that the openings 9 are closer to the closed cap 2 than to the apertured cap 3.

Briefly, the device is used substantially as follows:

To remove the cream in the comparatively restricted upper portion of the neck 5 of the bottle, the tube 1 is inserted with the apertured cap 3 lowermost. As the tube is thus lowered the cream 8 enters and flows upwardly therein through the opening 4, the air escaping through the openings 9. Now, by closing the openings 9 with a finger and the thumb of the hand in which the device is being held, the cream which has entered the tube 1 is air bound and retained therein and may be lifted out of the bottle. The tube 1 may then be conveniently emptied by holding said tube over a suitable receptacle and opening the ports or openings 9. Of course, the cream is discharged through the opening 4. Now, to remove the rest of the cream located in the comparatively large or flared lower portion of the neck 5 of the bottle, the tube 1 is inverted to bring the cap 2 lowermost for insertion in the bottle. As the closed end of the tube is thus lowered into the bottle the cream and milk displaced thereby is caused to rise into the restricted upper portion of the neck 5 where it flows into the tube 1 through the opnings 9. In this manner substantially all of the cream may be expeditiously removed. The tube 1 with the remainder of the cream therein is now lifted out of the bottle, the openings 9 are closed and said tube is then inverted to bring the cap 3 lowermost again for discharging the cream through the opening 4.

It is believed that the many advantages of a cream separator constructed in accordance with the present invention will be readily understood and although a preferred embodiment of the device is as illustrated and described, it is to be understood that changes in the details of construction may be resorted to which will fall within the scope of the invention as claimed. For example, the openings 9 may be located at any other suitable point in the tube 1.

What is claimed is:

1. A cream separator of the character described comprising a tube, caps on the ends of said tube, one of the caps having an opening therein, the tube having diametrically opposite openings therein at an intermediate point located closer to the other cap than to said one cap.

2. A cream separator including a tube closed at one end, and a cap on the other end of said tube having a restricted opening therein, said tube having openings therein at a point closer to its closed end than to said other end.

RALPH EDWARDS.